United States Patent

[11] 3,631,250

| [72] | Inventor | Lyman F. Van Buskirk<br>Ridgecrest, Calif. |
|---|---|---|
| [21] | Appl. No. | 11,222 |
| [22] | Filed | Feb. 13, 1970 |
| [45] | Patented | Dec. 28, 1971 |
| [73] | Assignee | The United States of America as represented by the Secretary of the Navy |

[54] OPTICAL POSITIVE FEEDBACK SENSOR CIRCUIT
1 Claim, 2 Drawing Figs.

[52] U.S. Cl. .................................................. 250/205, 250/219 D
[51] Int. Cl. .................................................. G01j 1/32
[50] Field of Search.................................. 250/205, 206, 217, 219 D, 219 DD; 307/311

[56] References Cited
UNITED STATES PATENTS

| 2,193,789 | 3/1940 | Braselton | 250/205 |
| 3,290,509 | 12/1966 | Meng | 250/219 |
| 3,462,606 | 8/1969 | Case | 250/214 |
| 3,517,167 | 6/1970 | Bell | 250/205 |
| 3,431,464 | 3/1969 | Brischnik | 250/205 |
| 3,437,822 | 4/1969 | Fitzsimmons | 250/205 |
| 3,456,155 | 7/1969 | Buchanan | 250/205 |
| 3,473,084 | 10/1969 | Dodge | 250/205 |

Primary Examiner—James W. Lawrence
Assistant Examiner—D. C. Nelms
Attorneys—R. S. Sciascia and Roy Miller

ABSTRACT: An optical positive feedback sensor circuit which converts regularly coded information into electrical signals. When not obstructed by the coded opaque pattern on a moving information carrier light from a light emitting diode is detected by a phototransistor. The output of the phototransistor is then amplified. A portion of the amplifier output provides positive feedback through the light emitting diode, driving the circuit into saturation. A circuit is included to maintain a light level at least sufficient to restart the operation after a period of light obstruction.

LYMAN F. VAN BUSKIRK
INVENTOR.

BY Roy Miller

Attorney 3,631,250

OPTICAL POSITIVE FEEDBACK SENSOR CIRCUIT

GOVERNMENT INTEREST

The invention described herein may be manufactured and used by or for the Government of the United States of America for governmental purposes without the payment of any royalties thereon or therefor.

BACKGROUND OF THE INVENTION

In the field of optical encoder readouts the conventional approach is to amplify an electrical signal produced by a photocell exposed by pulsed or continuous light rays with the optical path interrupted by a coded disk. The signal will vary as light incident on the photocell varies. When the amplified signal is determined to be greater than an established reference signal, decision circuits are caused to turn on or off, outputting a quantum level change to a computer or other digital circuit or device. The major problems with using this approach are that extreme linearity must be maintained (increasing cost), in order to maintain consistent detection (hence, accuracy), and age and changes in temperature cause shifts in the reference level, photocell output, and circuitry amplification, causing errors in the encoder output.

DESCRIPTION OF THE PREFERRED EMBODIMENT

Figure 1:
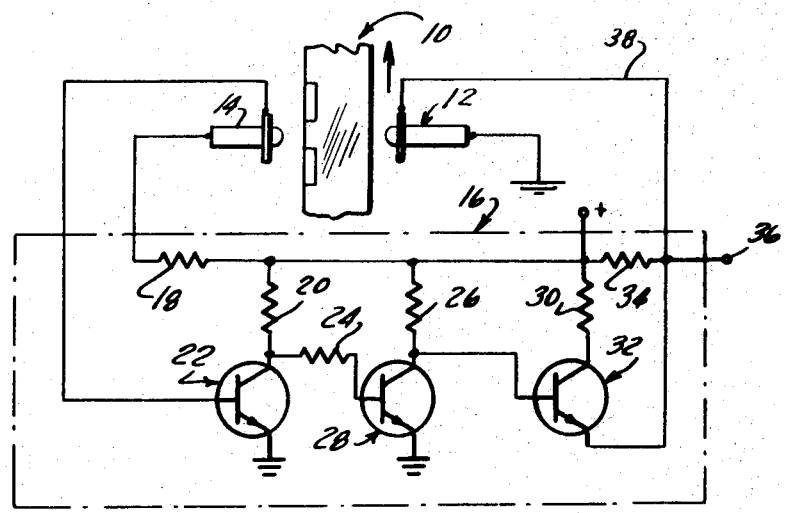
FIG. 1 is a schematic diagram of a device according to the invention.

Referring to FIG. 1 the optical encoder sensor comprises an information carrier 10 such as an encoder disk, a current dependent light emitter 12 such as a gallium arsenide light emitting diode, a photoresponsive device 14 such as a phototransistor, an amplifier 16, an electric signal output 36, and a positive feedback branch 38.

Phototransistor 14 is the input to the sensor circuit. Phototransistor 14 senses light from the gallium arsenide light-emitting diode 12 when not obstructed by the opaque information pattern formed on the encoder disk 10. The output of the phototransistor 14 is amplified by the amplifier 16 which provides an electric signal output 36 and a positive feedback via feedback branch 38 to the gallium arsenide light-emitting diode 12, driving it brighter. This increases the light reaching the phototransistor 14 which again drives the gallium arsenide light-emitting diode brighter causing the circuit to rapidly build to saturation.

When the encoder disk is moved to a position such that an opaque pattern is between the two photodevices 12 and 14, the flow of light from the gallium arsenide light-emitting diode 12 to phototransistor 14 is stopped, and the circuit quickly returns to a quiescent state.

The circuit is dependent on at least some light being emitted from the gallium arsenide light-emitting diode 12 continuously to assure starting. Therefore, a shunt resistor 34 is included to provide a small "keep-alive" current to the light-emitting diode.

Amplifier 16 can be of any suitable type designed to provide the necessary output and feedback, and, is shown by way of example only, as being three-stage, having transistors 22, 28 and 32, and bias resistors 18, 20, 26, and 30.

Figure 2:
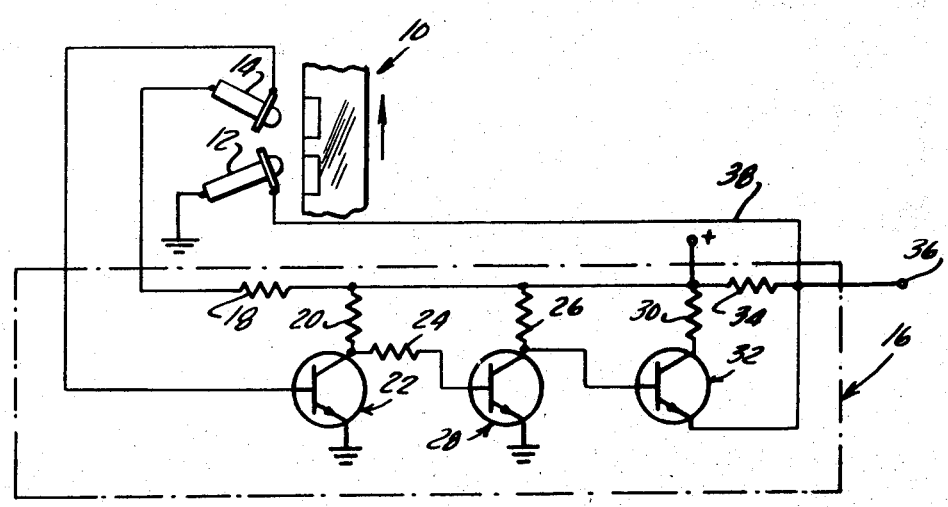
FIG. 2 is a schematic diagram of a different embodiment of a device according to the invention.

Referring to FIG. 2 a different embodiment of the invention is shown wherein the light emitter 12 and the photoresponsive device 14 are placed on the same side of the carrier 10. The emitted light is either not reflected or reflected depending upon the presence or absence of coded information indicia on the carrier 10 at the point of incidence. Thereby, light from the light-emitting diode 12, propagated by the carrier 10, is sensed by the phototransistor 14. The remainder of the circuit may be the same as in the previous embodiment or altered to provide the necessary output and feedback.

The data below is offered, as a guide only, in the interest of enabling the artisan to practice the invention with a minimum of designing.

These data are taken from a practical embodiment of the invention constructed along the line of the circuitry shown in FIG. 1 and FIG. 2.

| Reference Number | Component | Type or Value |
|---|---|---|
| 10 | encoder disc | Gray Code, 13 bits |
| 12 | gallium arsenide light emitting diode | Hewlett Packard AP 5082—4107 |
| 14 | phototransistor | Texas Instruments LS-400 |
| 18 | resistor | 2 Kilohm |
| 20 | resistor | 1 Kilohm |
| 22 | transistor | 2N1613 |
| 24 | resistor | 18 Kilohm |
| 26 | resistor | 2 Kilohm |
| 28 | transistor | 2N1613 |
| 30 | resistor | 2 Kilohm |
| 32 | transistor | 2N585 |
| 34 | resistor | 1 Kilohm |

The advantage of this circuit is that linearity is neither sought nor desired, thereby reducing production time, component count, and product size. The circuit has a high gain when turned "on" but a low gain when turned "off," and is intended to be nonlinear in nature to approach the characteristics of digital bistable circuits with which it will be used.

To further lower cost and improve reliability the circuit components can be mounted directly to the mechanical components of the encoder by microcircuit techniques and the substrates and code disc can be made of flat fiber-optic plates.

What is claimed is:

1. A photoelectric apparatus for sensing recorded information expressed in the form of the presence or absence of indicia born on a moving carrier and for expressing such information as sensed in the form of an electric signal, comprising:

a gallium arsenide light-emitting device positioned adjacent said carrier for illuminating said carrier such that the illumination is propagated by said carrier according to the presence and absence of said indicia;

a phototransistor positioned adjacent said carrier for detecting said illumination from said diode as propagated by said carrier;

a nonlinear amplifier connected to said phototransistor and said diode for amplifying the output of said diode and providing the system output of said apparatus, including a power supply at least one nonlinear amplification stage, and means coupling said power supply to said diode for maintaining illumination from said diode during periods of otherwise insufficient amplifier output to maintain operation of said apparatus; and feedback means electrically connecting said amplifier to said diode for positively feeding back a portion of the output of said amplifier to said diode;

such that when said phototransistor detects said illumination the electrical circuit of said apparatus rapidly builds to saturation.

* * * * *